United States Patent [19]

Traeger et al.

[11] Patent Number: 5,251,607
[45] Date of Patent: Oct. 12, 1993

[54] PELLET-FIRED COOKING GRILL

[76] Inventors: Joseph P. Traeger, 250 S. Oak St.; Mark A. Traeger, 530 Alder St.; Randolph J. Traeger, 540 Leo St., all of Mt. Angel, Oreg. 97362

[21] Appl. No.: 844,548

[22] Filed: Mar. 2, 1992

[51] Int. Cl.⁵ .............................................. A47J 37/00
[52] U.S. Cl. .................... 126/25 R; 126/73; 110/108
[58] Field of Search ............... 126/25 R, 25 A, 25 B, 126/73, 68, 10, 9 R, 11; 110/108, 102

[56] References Cited

U.S. PATENT DOCUMENTS

| | | | |
|---|---|---|---|
| 2,715,398 | 8/1955 | Smith et al. | 126/73 |
| 3,223,077 | 12/1965 | Tsakos | 126/25 R |
| 3,696,803 | 10/1972 | Holloway, Jr. | 126/25 R |
| 4,700,618 | 10/1987 | Cox, Jr. | 126/25 R |
| 4,867,050 | 9/1989 | Patenaude et al. | 126/25 R |
| 4,989,521 | 2/1991 | Traeger et al. | 110/108 |
| 5,144,939 | 9/1992 | Christopherson | 126/25 R |
| 5,176,124 | 1/1993 | Wrasse | 126/25 R |

*Primary Examiner*—James C. Yeung

[57] ABSTRACT

A pellet-fired cooking grill which includes a housing having a grill chamber defined within it. Tubular structure extends downwardly from the base of the chamber and defined within this structure is a burning zone. A hopper holding pellet fuel disposed above and adjacent the burning zone supplied pellets through a gravity operated chute to the burning zone.

1 Claim, 2 Drawing Sheets

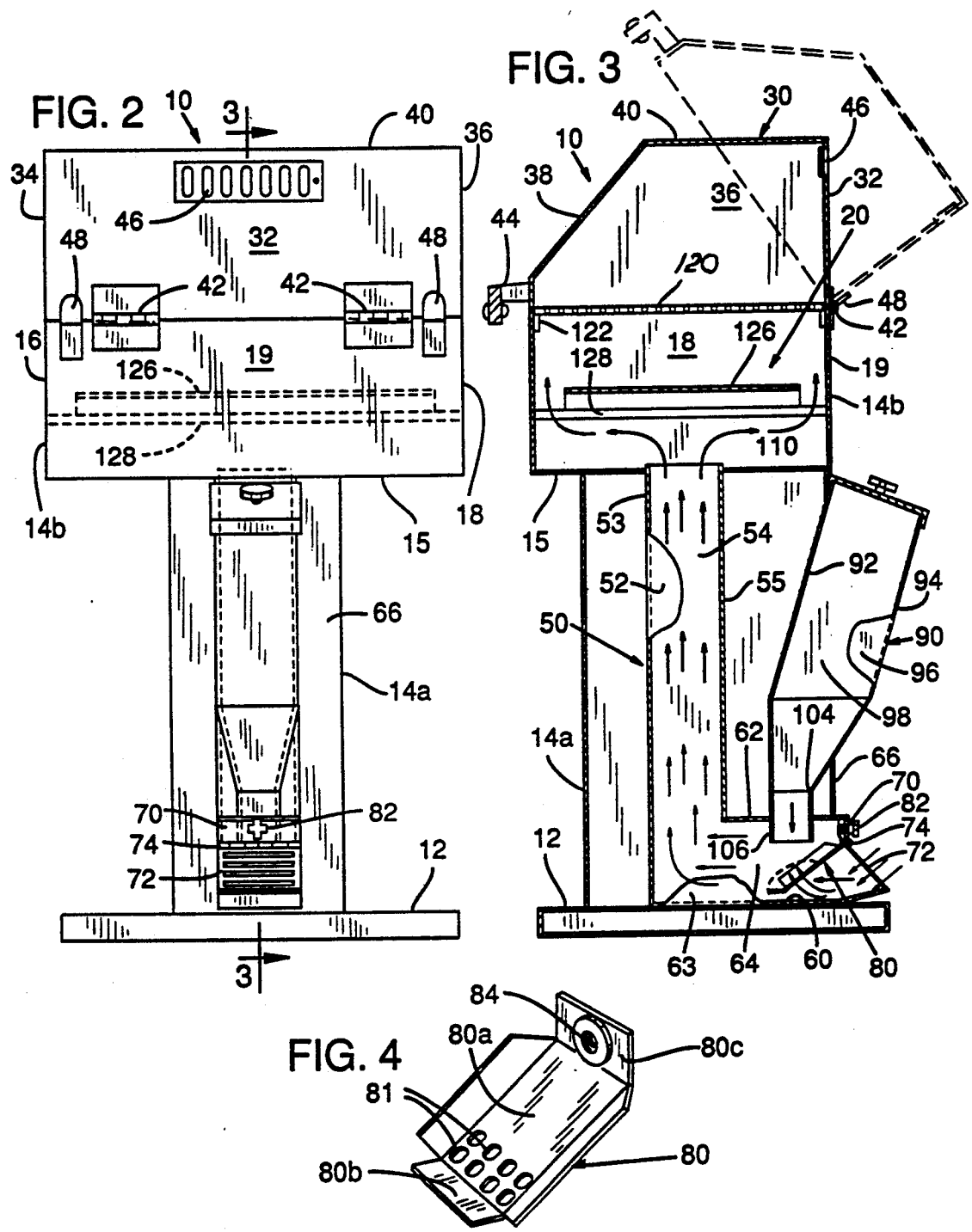

PELLET-FIRED COOKING GRILL

BACKGROUND AND SUMMARY OF THE INVENTION

This invention relates to a pellet-fired cooking grill, sometimes referred to as a barbecue. Apparatus of this description normally includes means for providing a source of heat, and are usable, usually in an outdoor setting, to prepare foods as by broiling or baking them.

A popular wood fuel product which is available today is so-called pellet fuel, taking the form of compressed pellets of wood or fibrous material. The pellets may be made from a variety of materials including sawdust and other residues, and typically have lengths ranging from one half to one and one half inches. Another example of what might be thought of as pellet fuel is comminuted poplar, or comminuted residue such as corn husks or nut shells. Whatever the particular description of the fuel, the fuel characteristically has a fairly uniform size, can be handled in a storage facility such as a hopper, and burns evenly when ignited and supplied with combustion supporting gas such as air.

This invention broadly concerns improvements in a cooking grill which utilizes pellet fuel as broadly defined herein. A cooking grill pursuant to the invention may rely upon the gravity feeding of pellet fuel from the storage hopper, whereby a mass of burning pellets may be sustained over a period of time which provides the source of heat for the cooking.

A cooking grill or a barbecue following the invention has a relatively simple construction yet is reliable in operation. The grill does not require a source of electric power for its operation. In utilizing pellet material instead of charcoal briquettes as the source of heat, economies in operation may be realized. Unlike gas-fired barbecues or grills, material cooked is subjected to a flavorful wood smoke to retain some of the taste thereof. A convection-type heating occurs with the barbecue grill which promotes even and sustained cooking of a variety of different food products.

BRIEF DESCRIPTION OF THE DRAWINGS

Various other objects and advantages are attained by the invention, which will be described herein; below in conjunction with the accompanying drawings, wherein:

FIG. 2 is a rear elevation of the grill;

FIG. 3 is a cross-sectional view of the grill, taken generally along the line 3—3 in FIG. 2; and FIG. 4 is a perspective view of a fuel burner in the grill.

DETAILED DESCRIPTION OF A PREFERRED EMBODIMENT

Figure 1:
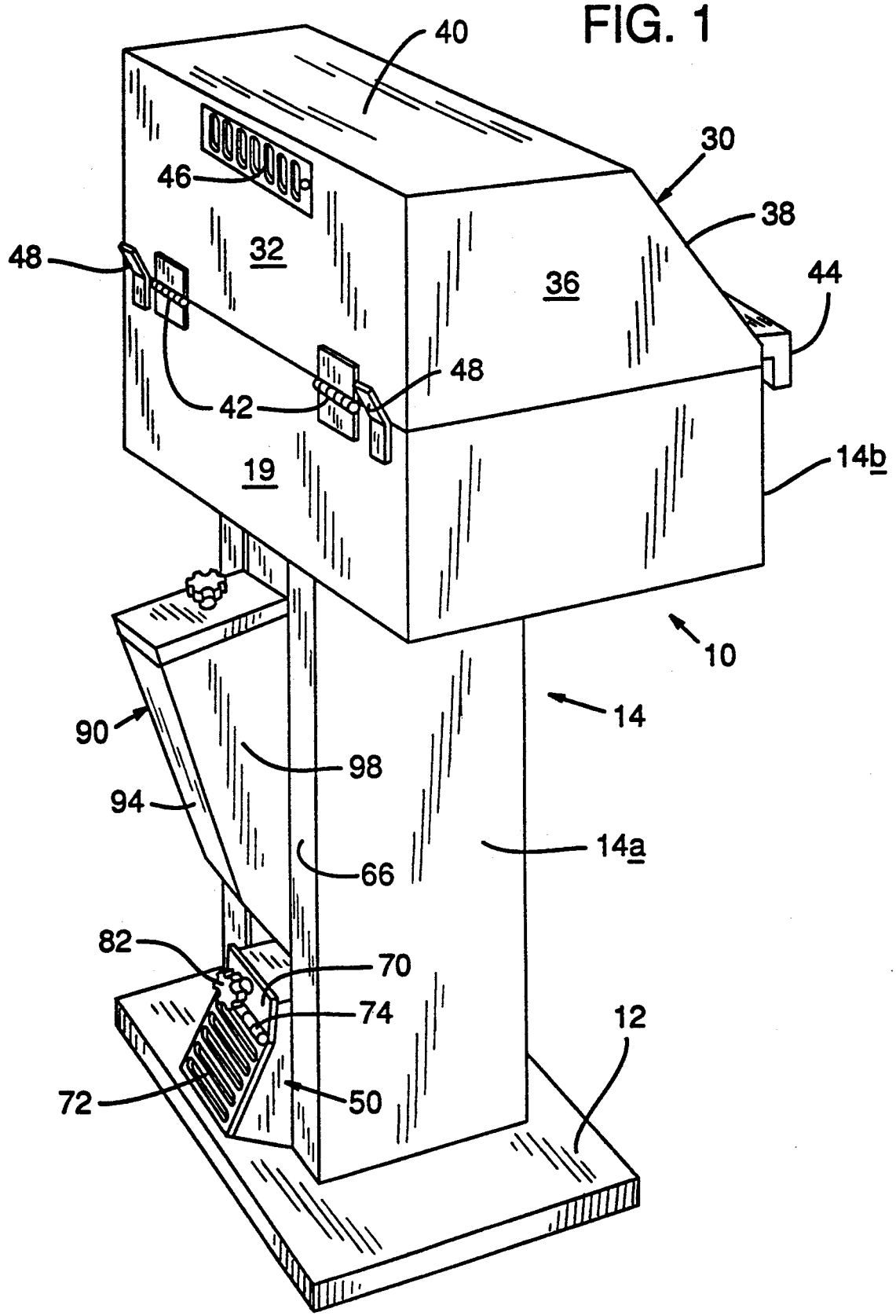
FIG. 1 is a perspective view showing a cooking grill as contemplated.

Referring now to the drawings, a cooking grill constructed pursuant to the invention is indicated generally at 10. Such includes a base or a pedestal 12 adapted to rest on the ground and a housing 14 supported by the pedestal including a lower portion 14a in the form of an elongate hollow column, and an upper portion 14b supported on the column 14a.

Upper portion 14b of the housing includes a base or bottom 15 and sides 16, 17, 18, and 19 joined to and projecting upwardly from bottom 15. The sides and base form a barbecue pan and define an internal chamber 20 referred to as a grill chamber. This chamber has an open top delineated by the upper edges of the sides.

Closing off this open top is a hood 30. The hood includes a rear wall 32, end wall 34, 36, and a front wall 38 which throughout most of its extent slopes downwardly and forwardly progressing from top 40 of the hood.

The hood is removably positioned over the open top 21 of the grill chamber. Hinges 42 mount the rear wall of the hood on housing portion 14b, and accommodate swinging of the hood from the position closing off the top of the grill chamber to one opening up the grill chamber for access, which is the position indicated in dashed outline in FIG. 3. A handle 44 may be provided to facilitate handling of the hood.

Providing for the escape of combustion products and cooking vapors is a vent opening 46 in rear wall 38. Stops 48 position the hood at its fully open position.

Extending downwardly within hollow column 14a is an elongate hollow casing, or tubular structure, 50. This structure has an upright extent within column 14a, such is formed by side walls 52, 53, 54, and 55. The casing structure angles off to the rear adjacent pedestal portion 12, where the structure in this rearwardly extending portion is defined by bottom wall 60, top wall 62, and side walls 63, 64.

The rear end of the tubular structure projects outwardly slightly from rear wall 66 of column 14a. The end of the tubular structure is partially closed by a lip 70. A perforate or slotted spark arrester 72 is mounted through a hinge 74 on the base of lip 70, and the arrester closes off the rest of the rear end of the tubular structure. The spark arrester is slotted to permit air to support combustion to flow therethrough.

Mounted within the tubular structure adjacent its rear end is a chute and shelf unit assembly 80, also referred to as a solid fuel burner. The unit includes a chute portion 80a, a shelf portion 80b, and a tab portion 80c. The tab portion 80c fits against the inside of lip 70. A screw with a knob end 82, and with its threaded end screwed into threaded bore 84 of the chute and shelf unit, holds the chute and shelf unit detachably in place within the end of the tubular structure. Holes 81 in chute portion 80a provide for combustion-supporting air flow.

Rear portions of bottom wall 60, top wall 62, and side walls 63, 64 adjacent the rear end of the tubular structure, extend about and define a burning zone in the cooking grill. The chute and shelf unit resides within this burning zone.

A hopper for holding pellet fuel is illustrated at 90. Such includes a front, a back, and sides 92, 94, 96, 98. The base of the hopper is funnel-shaped. Pellet fuel is stored within the hopper. The base of the funnel-shaped portion of the hopper has an opening 104 and this leads to a tube section 106 extending downwardly from the base of the hopper. The opening and tube section constitute guide structure guiding gravity induced flow of pellets from the interior of the hopper downwardly to be fed onto the chute and shelf unit.

During operation of the cooking grill, pellet fuel collects as a burning mass on the chute and shelf unit downwardly from tube section 106. As fuel is consumed and turns to ash, the level of this burning mass drops, permitting the flow of additional pellet fuel from the hopper, until flow is stopped by the material backing up against the underside of tube section 106. The gravity feed of material promotes continuous burning of pellet fuel in the burning zone. Combustion of such material is aided by the flow of air inwardly through the spark arrester, and through and around the chute and shelf unit. Air and combustion products produced in the burning zone flows through the hollow casing structure as indicated by the arrows in FIG. 3.

Casing structure 50 joins with base or bottom 15 of housing portion 14a. Bottom 15 is open at 110. Thus, the interior of the casing structure communicates with the grill chamber defined by housing portion 14b.

Within the grill chamber and adjacent the top of the chamber is a removable grill 120. The grill supports the food being cooked or smoked within the unit. The grill is removable for cleaning purposes. The grill rests on bracket structure 122.

Adjacent the bottom the barbecue pan is a baffle 126. The baffle removably rests on baffle bracket structure 128. Hot combustion products moving upwardly into the grill chamber from hollow casing structure 50 move toward and then surround the baffle to produce a convection-type circulation within the cooking grill. The baffle also performs the function of preventing drippings and food pieces from dropping downwardly in the unit and into the hollow casing structure.

Describing operation of the unit, pellet fuel falls downwardly from the hopper to build up as a mass on the chute and shelf unit, with this mass eventually stopping further flow of fuel downwardly. It is a relatively easy matter to start combustion in this massive fuel, using a match and a small amount of lighter fuel. With burning started, a draft is quickly established with air being drawn inwardly into the hollow casing structure and thence upwardly through the vertical extent of the casing structure into the interior of the barbecue pan. With ignition started air and partially combusted materials and flame are carried away from the burning mass and through the casing structure to be expelled into the barbecue pan.

Food to be cooked is placed upon the grill. An even cooking of this food results as the result of the hot gaseous material which circulates within the interior of the housing and hood as a result of the burning mass of pellet fuel earlier described.

While and embodiment of the invention has been described, obviously modifications and variations are possible without departing from the invention.

It is claimed and desired to secure by letters patent:

1. A pellet-fired cooking grill comprising:
 a housing having an upper portion and a lower portion,
 a grill chamber defined within the upper portion of the housing and the grill chamber having an open top and a base, a grill adjacent the top of the chamber, an opening in the base of the chamber,
 tubular structure with a hollow interior extending downwardly from the base of the chamber with said interior connecting with said opening,
 a burning zone defined within said tubular structure spaced from said opening, and
 a gravity fed solid fuel burner disposed within said burning zone adapted to receive pellet fuel,
 said lower portion of the housing having an inner surface defining a hollow cavity within the lower portion and said tubular structure extending downwardly through said cavity with an air space defined between said tubular structure and said inner surface of said lower portion of the housing
 said lower portion of the housing having an upstanding side wall and the grill further including a fuel hopper disposed above the burning zone with a feed chute leading from the base of the hopper adapted to dump through gravity pellet fuel onto said fuel burner, the hopper extending through said side wall of the lower portion of the housing.

* * * * *